US008848816B2

(12) United States Patent
Sridhara et al.

(10) Patent No.: US 8,848,816 B2
(45) Date of Patent: Sep. 30, 2014

(54) METHOD AND APPARATUS FOR DETERMINING THE SPATIAL CHANNELS IN A SPATIAL DIVISION MULTIPLE ACCESS (SDMA)-BASED WIRELESS COMMUNICATION SYSTEM

(75) Inventors: Vinay Sridhara, Santa Clara, CA (US); Sanjiv Nanda, San Diego, CA (US); Santosh P. Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 902 days.

(21) Appl. No.: 12/328,693

(22) Filed: Dec. 4, 2008

(65) Prior Publication Data

US 2009/0290616 A1    Nov. 26, 2009

Related U.S. Application Data

(60) Provisional application No. 61/055,012, filed on May 21, 2008, provisional application No. 61/090,501, filed on Aug. 20, 2008.

(51) Int. Cl.
*H04B 7/02* (2006.01)
*H04B 7/06* (2006.01)
*H04B 7/04* (2006.01)

(52) U.S. Cl.
CPC ............ *H04B 7/0417* (2013.01); *H04B 7/0615* (2013.01)
USPC ........... 375/267; 375/299; 375/295; 375/221; 375/146; 375/260; 375/285; 455/186.1; 455/205; 370/350

(58) Field of Classification Search
USPC ......... 375/267, 299, 295, 221, 146, 260, 285; 455/186.1, 502; 370/350
See application file for complete search history.

(56) References Cited

U.S. PATENT DOCUMENTS

| 5,852,630 | A  | * | 12/1998 | Langberg et al. ............. 375/219 |
| 6,738,020 | B1 | * | 5/2004  | Lindskog et al. ............. 342/377 |
| 7,342,912 | B1 |   | 3/2008  | Kerr |
| 7,706,324 | B2 |   | 4/2010  | Sutivong et al. |
| 7,804,800 | B2 | * | 9/2010  | Li et al. ......................... 370/334 |
| 7,903,615 | B2 |   | 3/2011  | Gorokhov et al. |

(Continued)

FOREIGN PATENT DOCUMENTS

| CN | 1518260 A     | 8/2004 |
| WO | 2007015962 A2 | 2/2007 |

(Continued)

OTHER PUBLICATIONS

Anonymous Ed—Anonymous: IEEE Standard for Local and metropolitan area networks Part 16: Air Interface for Fixed and Mobile Broadband Wireless Access Systems Amendment 2: Physical and Medium Access Control Layers for Combined Fixed and Mobile Operation.

(Continued)

*Primary Examiner* — Siu Lee
(74) *Attorney, Agent, or Firm* — Dang M. Vo (57) ABSTRACT

An access point is disclosed herein that comprises a wireless network adapter configured to support a backhaul connection for a peer node to a network; a processing system configured to calculate precoding matrices that define spatial streams; and a transceiver configured to transmit data to the nodes on the spatial streams.

35 Claims, 5 Drawing Sheets

(56) References Cited

U.S. PATENT DOCUMENTS

| | | | |
|---|---|---|---|
| 2006/0214036 A1 | 9/2006 | Makino | |
| 2007/0286303 A1* | 12/2007 | Yamaura | 375/267 |
| 2007/0286306 A1 | 12/2007 | Dahlfeld | |
| 2008/0049709 A1 | 2/2008 | Pan et al. | |
| 2008/0118004 A1* | 5/2008 | Forenza et al. | 375/299 |
| 2008/0165717 A1* | 7/2008 | Chen et al. | 370/312 |
| 2008/0317145 A1* | 12/2008 | Clerckx et al. | 375/260 |
| 2009/0040973 A1 | 2/2009 | Iwai et al. | |
| 2009/0086690 A1* | 4/2009 | Gu et al. | 370/338 |
| 2009/0209264 A1* | 8/2009 | Yang et al. | 455/452.1 |
| 2009/0214036 A1 | 8/2009 | Shen et al. | |
| 2011/0122971 A1* | 5/2011 | Kim et al. | 375/316 |

FOREIGN PATENT DOCUMENTS

| | | | |
|---|---|---|---|
| WO | 2007088854 A1 | 8/2007 | |
| WO | 2008002972 | 1/2008 | |
| WO | 2008045980 A2 | 4/2008 | |

OTHER PUBLICATIONS

International Search Report—PCT/US09/040254, International Search Authority—European Patent Office—Jul. 8, 2009.

Written Opinion—PCT/US09/040254, International Search Authority—European Patent Office—Jul. 8, 2009.

International Search Report and Written Opinion—PCT/US2009/037697, International Search Authority—European Patent Office—Jul. 8, 2009.

IEEE Computer Society and IEEE Microwave Theory and Techniques Society: "IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE Std 802.16e-2005 and IEEE Std 802.16-2004/Cort-2005; IEEE Standard; Piscataway, NJ, USA, (Feb. 28, 2006), pp. 353-648.

Taiwan Search Report—TW098108787—TIPC—Jan. 8, 2013.

Catt et al.,Downlink reference signal aspects for non-codebook based pre-coding in TDD mode, 3GPP R1-071746, Mar. 30, 2007.

Catt et al.,Pre-coding for EUTRA TDD,3GPP R1-071749,Mar. 30, 2007.

Catt et al.,Views on the High Level Principles of MIMO for unicast traffic in E-UTRA downlink,3GPP R1-060521, Feb. 17, 2006.

Motorola,Uplink sounding for obtaining channel state information at Node B in EUTRA,3GPP R1-071342, Mar. 30, 2007.

* cited by examiner

METHOD AND APPARATUS FOR DETERMINING THE SPATIAL CHANNELS IN A SPATIAL DIVISION MULTIPLE ACCESS (SDMA)-BASED WIRELESS COMMUNICATION SYSTEM

CLAIM OF PRIORITY UNDER 35 U.S.C. §119

The present Application for Patent claims priority to Provisional Application No. 61/090,501 entitled "METHOD AND APPARATUS FOR DETERMINING THE SPATIAL CHANNELS IN A SDMA BASED WIRELESS COMMUNICATION SYSTEM" filed Aug. 20, 2008, and Provisional Application No. 61/055,012 entitled "METHOD AND APPARATUS FOR DETERMINING THE SPATIAL CHANNELS IN A SDMA BASED WIRELESS COMMUNICATION SYSTEM" filed May 21, 2008, and assigned to the assignee hereof and hereby expressly incorporated by reference herein.

BACKGROUND

I. Field

The following description relates generally to communication systems, and more particularly, to a method and apparatus for determining the spatial channels in a Spatial Division Multiple Access (SDMA)-based wireless communication system.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple In, Multiple Out (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface (air link medium) standards developed by the IEEE 802.11 committee for short-range communications (e.g., tens of meters to a few hundred meters).

In wireless communication systems, Medium Access Control (MAC) protocols are designed to exploit several degrees of freedom offered by the air link medium. The most commonly exploited degrees of freedom are time and frequency. For example, in the IEEE 802.11 MAC protocol, the time degree of freedom is exploited through the Carrier Sense Multiple Access (CSMA) protocol. The CSMA protocol attempts to ensure that no more than one transmission occurs in a neighborhood of potential high interference. The frequency degree of freedom can be exploited by using different channels.

Recent developments have led to the space dimension being a viable option. SDMA can be used for improving utilization of the air link medium by scheduling multiple terminals for simultaneous transmission and reception. Data is sent to each of the terminals using spatial streams. For example, with SDMA, a transmitter forms streams of transmissions ("transmission streams") that are orthogonal to individual receivers. Such orthogonal streams can be formed because the transmitter has several antennas and the transmit/receive channel consists of several paths. The receivers may also have one or more antennas such as in Single In, Multiple Out (SIMO) or MIMO receivers. For this example, assume that the transmitter is an access point (AP) and the receivers are stations (STAs). The streams are formed such that a stream targeted at a Station 1 (STA-1), for example, is seen as low power interference at a Station 2 (STA-2), and a Station 3 (STA-3). In order to form the orthogonal streams, the AP needs to have the Channel State Information (CSI) from each of the receiving STAs. The CSI can be measured and communicated in several ways. Disclosed are aspects that describe efficient requesting, gathering, and computing of the channel state information of the spatial streams. The various described aspects may be useful for Very High Throughput (VHT) transmissions in a wireless network.

Consequently, it would be desirable to address one or more of the deficiencies described above.

SUMMARY

According to various aspects, the subject innovation relates to systems and/or methods for determining the spatial channels in a spatial division multiple access (SDMA)-based wireless communication system.

In one aspect, an apparatus for communicating with a plurality of nodes is disclosed. The apparatus comprises a processing system configured to calculate precoding matrices that define spatial streams; and a transceiver configured to transmit data to the nodes on the spatial streams.

In another aspect, a method for communicating with a plurality of nodes includes calculating precoding matrices that define spatial streams; and transmitting data by a transceiver to the nodes on the spatial streams.

In still another aspect, an apparatus for communicating with a plurality of nodes includes means for calculating precoding matrices that define spatial streams; and means for transmitting data by a transceiver to the nodes on the spatial streams.

In still another aspect, a computer-program product for communication includes machine-readable medium encoded with instructions executable to calculate precoding matrices that define spatial streams; and transmit data to the nodes on the spatial streams.

In still another aspect, an access point includes a wireless network adapter configured to support a backhaul connection for a peer node to a network; a processing system configured to calculate precoding matrices that define spatial streams; and a transceiver configured to transmit data to the nodes on the spatial streams.

BRIEF DESCRIPTION OF THE DRAWINGS

These and other sample aspects of the invention will be described in the detailed description that follow, and in the accompanying drawings, wherein.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein one skilled in the art should appreciate that that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Figure 1:
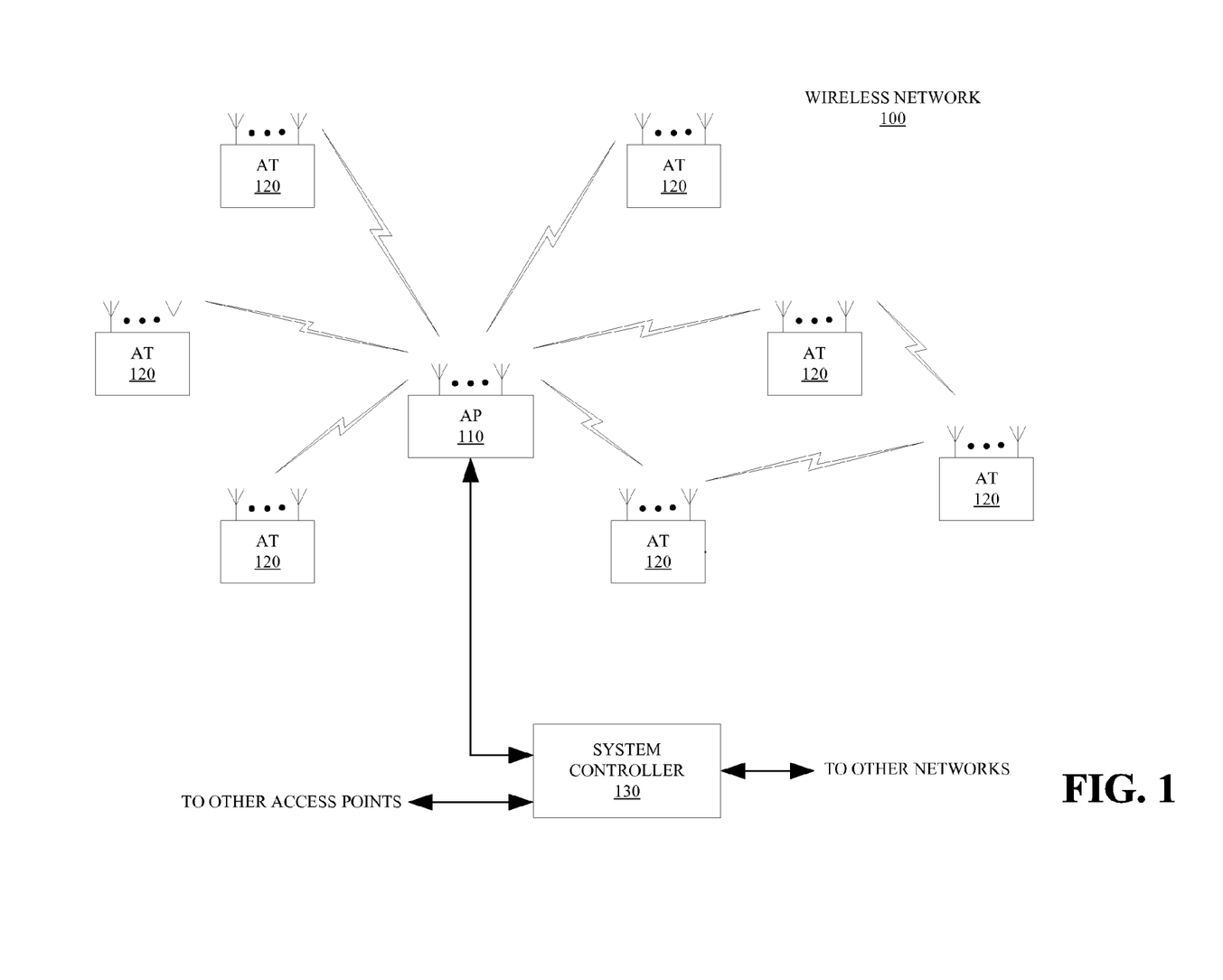
FIG. 1 is a diagram of a wireless communications network.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using SDMA. SDMA is a multiple access scheme that enables multiple streams transmitted to different receivers at the same time to share the same frequency channel and, as a result, provide higher user capacity. This is achieved by spatially coding each data stream and then transmitting each spatially coded stream through a different transmit antenna on the downlink. The spatially coded data streams arrive at the access terminals with different spatial signatures, which enables each access terminal 120 to recover the data stream destined for that access terminal 120. On the uplink, each access terminal 120 transmits a spatially coded data stream, which enables the access point 110 to identify the source of each spatially coded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention is not limited to any particular wireless technology and/or air interface standard.

The wireless node, whether an access point or access terminal, may be implemented with a protocol that utilizes a layered structure that includes a physical (PHY) layer that implements all the physical and electrical specifications to interface the wireless node to the shared wireless channel, a MAC layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

When the wireless node in a transmit mode, the application layer processes data, segments the data into packets, and provides the data packets to the MAC layer. When the MAC layer decides to transmit, it provides a block of MAC packets to the PHY layer. The PHY layer assembles a PHY packet by assembling the block of MAC packets into a payload and adding a preamble. As will be discussed in greater detail later, the PHY layer is also responsible for providing various signal processing functions (e.g., modulating, coding, spatial processing, etc.). The preamble, which is sometimes referred to as Physical Layer Convergence Protocol (PLCP), is used by the receiving node to detect the start of the PHY packet and synchronize to the transmitter's node data clock. The preamble contains a training signal usable to assist in improving the steering of the streams transmitted by the antennas. The training signal is also known as pilot or sounding signals. The PHY packet is sometimes referred to as a Physical Layer Protocol Data Unit (PLPDU), but may also be referred to as a frame, packet, timeslot, segment, or any other suitable nomenclature.

When the wireless node is in a receive mode, the process is reversed. That is, the PHY layer detects an incoming PHY packet from the wireless channel. The preamble allows the PHY layer to lock in on the PHY packet and perform various signal processing functions (e.g., demodulating, decoding, spatial processing, etc.). Once processed, the PHY layer recovers the block of MAC packets carried in the payload of the PHY packet and provides the MAC packets to the MAC layer.

Figure 2:
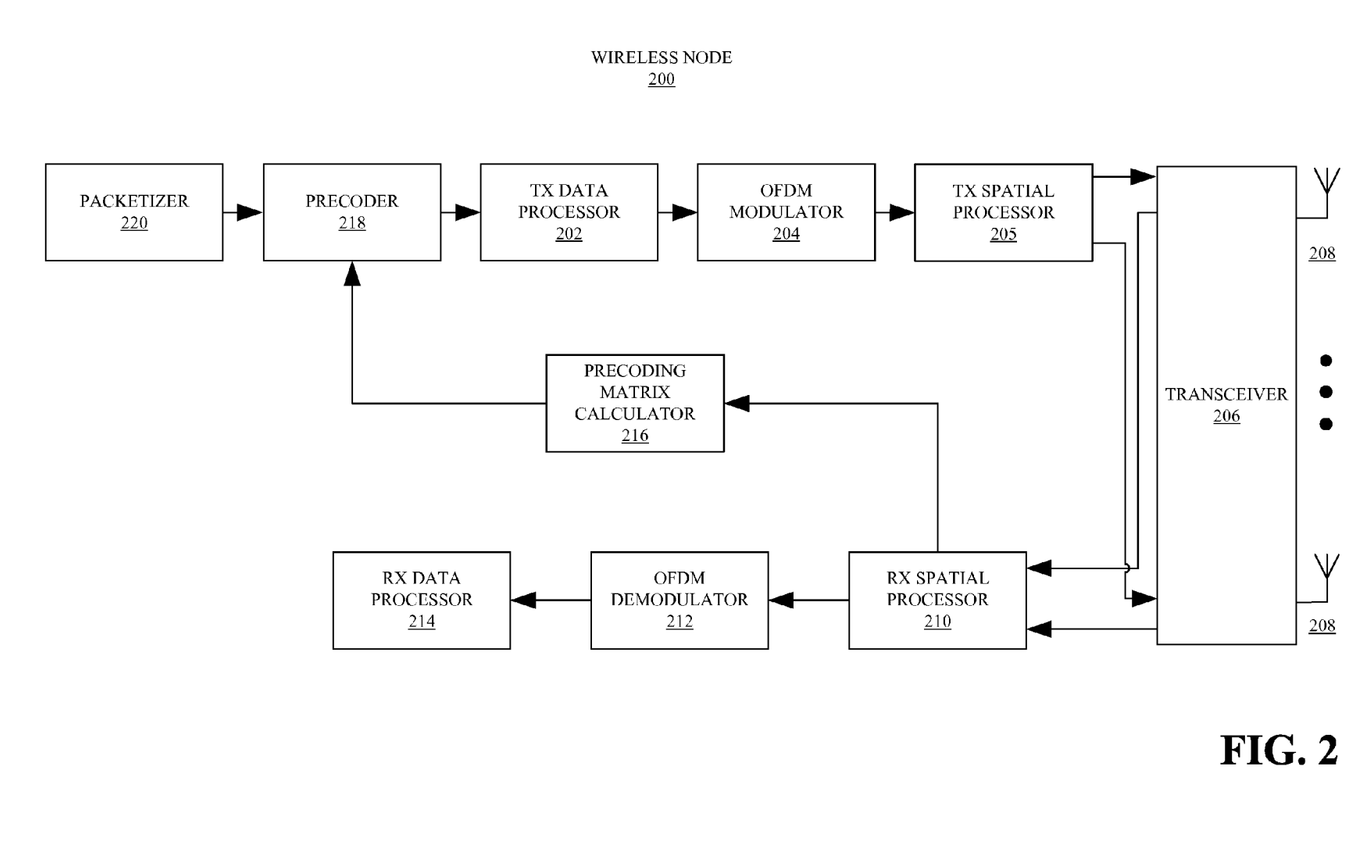
FIG. 2 is a block diagram of an example of various signal processing functions of a PHY layer of a wireless node in the wireless communications network of FIG. 1.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 205 performs spatial processing on the OFDM stream. This may be accomplished by spatially precoding each OFDM and then providing each spatially precoded stream to a different antenna 208 via a transceiver 206. Each transceiver 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 210.

In wireless nodes implementing OFDM, the stream (or combined stream) from the RX spatial processor 210 is provided to an OFDM demodulator 212. The OFDM demodulator 212 converts the stream (or combined stream) from time-domain to the frequency domain using a Fast Fourier Transform (FFT). The frequency domain signal comprises a separate stream for each subcarrier of the OFDM signal. The OFDM demodulator 212 recovers the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

The wireless node 200 also includes a packetizer 220. On a transmit operation, data is fed into the packetizer 220. Specifically, the packetizer 220 operates to receive data from the MAC layer and create packets of an appropriate size and format to be transmitted.

A precoder 218 utilizes the preceding matrix to process the output of the packetizer 220 before sending it to the TX data processor 202, which itself is before it is sent to the TX spatial processor 205 after being processed by the OFDM modulator 204. The precoder 218 utilizes the precoding matrix to code the data from packetizer 220 to compensate for the spatial channel conditions, as described herein.

On a receive operation, data received by the spatial RX processor 210 is sent to the RX data processor 214 after it has been processed by the OFDM demodulator 212. The data received and processed by the RX spatial processor 210 is forwarded to a precoding matrix calculator 216. The result of the preceding matrix calculator 216 is fed to the precoder 218.

Figure 3:
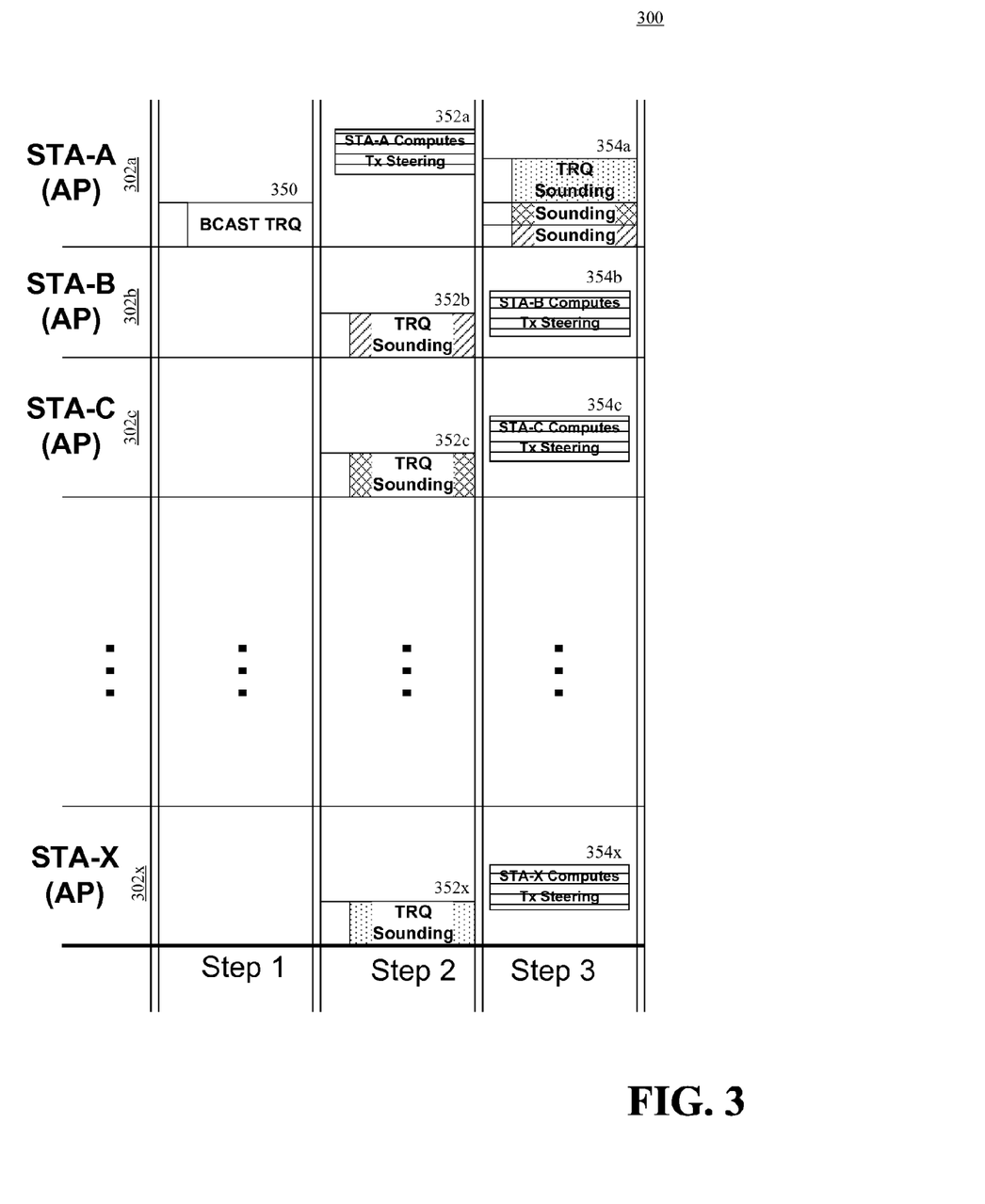
FIG. 3 is a timing diagram illustrating a steering information creation process usable with the wireless communications network of FIG. 1; and, FIG. 4 is a flow diagram of the operation of the steering information creation aspect of the wireless communications network of FIG. 1.
Figure 4:
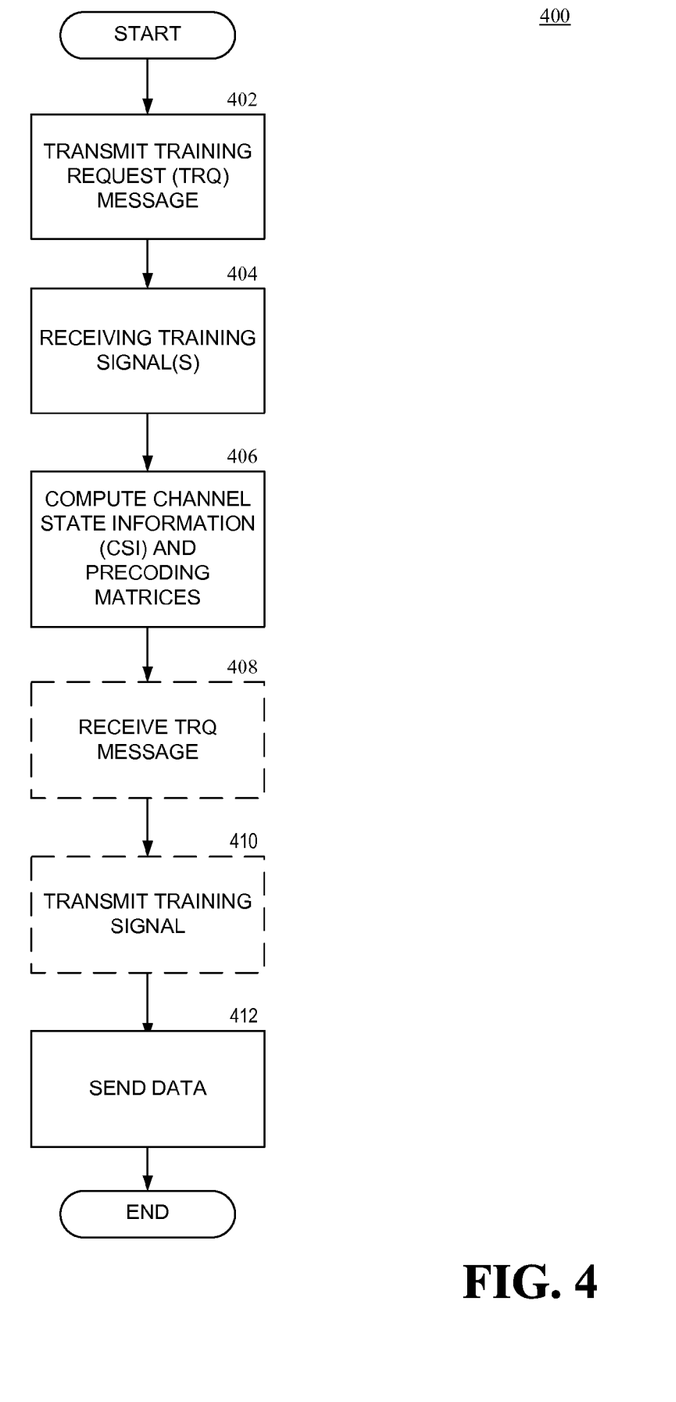

Referring to FIG. 3, and further referring to FIG. 4, a timing diagram 300 and a flow diagram 400 will be used to describe an aspect of operation of the wireless node 200, where the wireless node is an access point 2 optimizing its ability to steer its transmissions to multiple receivers. In this example, SDMA is utilized from an access point (AP) STA-A 302a to multiple responder stations STA-B 302b, STA-C 302c through STA-X 302x. In order to optimize steering, the access point STA-A 302a needs Channel State Information (CSI) from each of the responder stations STA-B 302b through STA-X 302x.

In one approach, as illustrated in step 402, in order to obtain such CSI, the access point STA-A 302a sends a training request (TRQ) message 350 to the responder stations STA-B 302b through STA-X 302x. The TRQ message 350 may be unicast to each responding station, or broadcast to all the stations STA-B 302b through STA-X 302x, as shown in FIG. 3. The TRQ message 350 may contain the following information: scheduled times for the training signals from each of the responder stations STA-B 302b through STA-X 302x, or a unique identifier or method of identifying the training signal received from each of the responder stations STA-B 302b through STA-X 302x.

It should be noted that the scheduled time for the training signals may be implicit or explicit. An example of an implicit training schedule would be for the responder stations to schedule transmission of training signals a fixed duration after receiving the TRQ message 350. Another method would be for the responder stations to send the training signals in a staggered fashion with a fixed delay between transmissions of the successive responder stations. The order in which the responder stations will send the training signals may be specified by the TRQ message 350. The access point STA-A 302a may also simply request a time at which each of the responder stations must send its training signal. Various ways of indicating the time to respond can be utilized. For example, a bit in the TRQ message 350 could signify the time the responder stations STA-B 302b through STA-X 302x are to respond after a certain amount of time.

The access point STA-A 302a must also indicate an implicit or explicit method so that the training signal from each of the responder stations STA-B 302b through STA-X 302x can be distinguished. One method would be to use the time of arrival of the training signals to identify the responding station. Another method would be for each responder station to use a unique training signal which may be based on the responder station's unique identifier or may be specified by the TRQ message 350. The access point STA-A 302a could also send the request on Orthogonal Frequency Division Multiple Access (OFDMA) sub-bands. Several types of training signals may be constructed for training purposes. For example, in one approach a known training sequence that is scrambled using a unique receiving station identifier may be used. Another approach may be to assign a unique Walsh cover code to each responder station. The unique identifier can be statically or dynamically assigned to the responder stations. In addition, one of the responder stations STA-B 302b through STA-X 302x or the access point STA-A 302a may piggyback a data transmission on the training requests/signals if the transmitted data can be received and decoded at the receiving access point STA-A 302a or responding stations.

Continuing with FIG. 3, in step 404, after the TRQ message 350 is broadcast, each of the receiving stations STA-B 302b through STA-X 302x responds with a respective training signals 352b through 352x. The responder stations STA-B 302b through STA-X 302x will each be assigned an orthogonal code to allow the access point STA-A 302a to uniquely identify their respective training signals 352b through 352x. In one approach, a Walsh cover code will be used. These returned training signals 352b through 352x can now be uniquely decoded by knowing these pre-assigned or implicitly inferred orthogonal codes.

In step 406, once the training signals 352b through 352x are received at the access point STA-A 302a, the access point STA-A 302a calculates the CSI for each responder station STA-B 302b through STA-X 302x that has sent a training signal. The CSI of each of the responder stations STA-B 302b through STA-X 302x is combined and used to calculate preceding matrices. The preceding matrices define the spatial streams to each of the responder stations STA-B 302b through STA-X 302x. In one aspect of the disclosure, these spatial streams are such that data sent on a spatial stream for the STA-B 302b may be received with relatively high Signal-to-Noise Ratio (SNR) at the responder station STA-B 302b, but will only appear as a low noise signal at the other responder stations. If a responder station, for example, the responder station STA-B 302b, does not send a training signal, e.g., due to an error in reception of the TRQ message 350, the access point STA-A 302a may either refrain from sending spatially multiplexed data to STA-B 302b or may use the CSI obtained from earlier training requests.

In step 408, one or more of the responder stations STA-B 302b through STA-X 302x will transmit a TRQ message to the access point STA-A 302a. Once the access point receives the TRQ message, operation continues with step 410.

In step 410, the access point STA-A 302a will send a training message in response to the TRQ message sent by one of the stations STA-B 302b through STA-X 302x.

In step 412, once the precoding matrices are calculated, the access point STA-A 302a may send data to the responder stations. The precoded data are preceded by a long training field (LTF), which may include a pilot, sounding, or training sequence. Each responder station may then receive its data at a high SNR due to the precoded transmission.

In some scenarios, a plurality of responder stations may transmit data to the access point STA-A 302a without any preceding. The access point STA-A 302a can decode the data from the individual responder stations by using the CSI collected during the training phase.

Note that several modes of transmission may be used at the access point STA-A 302a for requesting training messages from the responder stations. The access point STA-A 302a may send TRQ messages that are staggered in time (TDMA). The TRQ messages may be piggybacked on a data transmission from the access point STA-A 302a to the responder stations. In addition, the access point STA-A 302a may also use OFDMA to send TRQ messages to each of the responder stations. In addition, if the precoding matrices that were calculated in a previous exchange are still valid, the TRQ messages may be sent using SDMA with the previously calculated preceding matrices.

Various ways of computing or calculating the preceding matrices can be used, such as well-known techniques in the art. For example, MMSE, zero forcing, or singular value decomposition, can be used. Also, other terminologies for a precoding matrix may be steering matrix, steering vectors, and steering vectors that may be derived from a full CSI. Alternately, the receiver may provide CSI feedback by feeding back steering vectors from a codebook.

The TRQ message 350 may be a multi-client TRQ message. For example, multiple responder stations are sent a request using an Aggregate Physical Layer Protocol Data Unit (APPDU) that is destined for multiple responder stations. In this approach, training requests are sent using TDMA and frames are sent to multiple stations in a single time division multiplexed transmission.

In another approach, the transmitting station sends training requests using SDMA to multiple responding stations using OFDMA. The responding stations can then respond with their training signals. By doing this, the access point STA-A 302a computes the precoding matrix for downlink SDMA transmissions. After receiving the training information, the transmitting station transmits data along with the computed precoding matrix. This will be used for the responding stations to transmit the uplink data using SDMA.

In addition to operating using SDMA, the TRQ message 350 may also be transmitted using OFDMA techniques. Further, the training information from the various responder stations is sent back using OFDMA. This technique might be useful for training more spatial streams than what an access point such as the STA-A 302a can support. By doing so, the access point STA-A 302a will be maximizing its options for a optimized scheduling.

Figure 5:
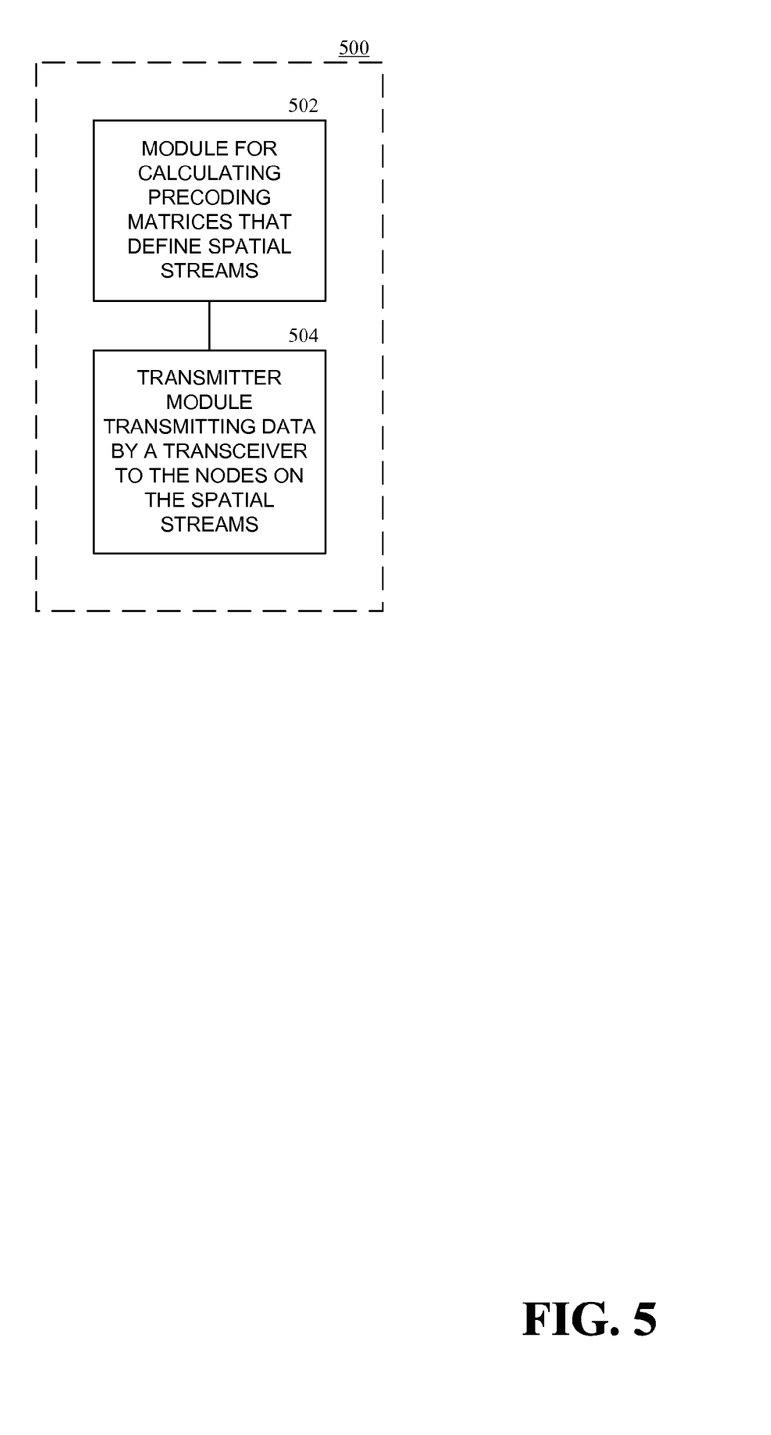
FIG. 5 is a functional block diagram of a signal processor of a wireless node in the wireless communications network of FIG. 1.

FIG. 5 is a functional block diagram of a signal processor 500 of a wireless node in the wireless communications network of FIG. 1. The signal processor 500 includes a calculator module 502 that calculates precoding matrices that define spatial streams. The signal processor 500 also includes a transmitter module 504 that transmits data by a transceiver to the nodes on the spatial streams It is understood that any specific order or hierarchy of steps described in the context of a wireless node is being presented to provide an examples of a wireless node. Based upon design preferences, it is understood that the specific order or hierarchy of steps may be rearranged while remaining within the scope of the invention.

The various portions of the wireless node may be implemented with one or more general purpose processors, digital signal processors (DSP)s, application specific integrated circuits (ASIC)s, field programmable gate array (FPGA)s, programmable logic devices (PLD)s, other programmable logic components, discrete gate or transistor logic, discrete hardware components, or any combination thereof designed to perform the functions described herein. A general purpose processor may be a microprocessor, a controller, a microcontroller, a state machine, or any other circuitry that can execute software. Software shall be construed broadly to mean instructions, data, or any combination thereof, whether referred to as software, firmware, middleware, microcode, hardware description language, or otherwise. Software may be stored on machine-readable media or embedded in one or more components such as a DSP or ASIC. Machine-readable media may include various memory components including, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Machine-readable media may also be include a transmission line, a carrier wave modulated by data, and/or other means for providing software to the wireless node. The machine-readable may be embodied in a computer-program product. The computer-program product may comprise packaging materials.

Whether the various aspects of the preceding is implemented in hardware, software, or a combination thereof will depend upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communicating with a plurality of nodes, comprising:
    a processing system configured to:
        request training signals from the nodes by requesting each of the nodes to use a unique identifier in its training signal;
        receive the training signals transmitted from the nodes in response to the request;
        calculate a channel state information matrix for each of the nodes from the training signals; and
        calculate precoding matrices that define spatial streams using the channel state information matrices, wherein at least one of the precoding matrices is calculated using a plurality of the channel state information matrices; and
    a transmitter configured to transmit data to the nodes on the spatial streams.

2. The apparatus of claim 1 wherein the processing system is further configured to receive the training signals that are transmitted by the nodes simultaneously within the same frequency band.

3. The apparatus of claim 1 wherein the processing system is further configured to request training by generating a training request message for transmission by the transmitter to the nodes, wherein the training request message comprises a schedule for the nodes to transmit their training signals.

4. The apparatus of claim 1 wherein the training signals were transmitted simultaneously.

5. The apparatus of claim 1 wherein the processing system is further configured to receive the training signals covered with spreading or scrambling codes.

6. The apparatus of claim 1 wherein the processing system is further configured to receive the training signals at different times.

7. The apparatus of claim 1 wherein the processing system is further configured to use the precoding matrices to precode the data transmitted by the transmitter to the nodes.

8. The apparatus of claim 1 further comprising a plurality of antennas, wherein each of the antennas supports one of the spatial streams for the transmitter to transmit data to the nodes.

9. The apparatus of claim 1 wherein the processing system is further configured to request training by providing to the nodes information relating to spreading or scrambling codes for the training signals.

10. The apparatus of claim 9 wherein the information comprises the spreading or scrambling codes.

11. The apparatus of claim 9 wherein the information provides sufficient information for computing the spreading or scrambling codes.

12. A method for communicating with a plurality of nodes, comprising:
    requesting training signals from the nodes by requesting each of the nodes to use a unique identifier in its training signal;

receiving the training signals transmitted from the nodes in response to the request;

calculating a channel state information matrix for each of the nodes from the training signals;

calculating precoding matrices that define spatial streams using the channel state information matrices, wherein at least one of the precoding matrices is calculated using a plurality of the channel state information matrices; and transmitting data to the nodes on the spatial streams.

13. The method of claim 12 wherein the training signals are received simultaneously within the same frequency band.

14. The method of claim 12 wherein the requesting is done by generating a training request message for transmission to the nodes, wherein the training request message comprises a schedule for the nodes to transmit their training signals.

15. The method of claim 12 wherein the training signals were transmitted simultaneously.

16. The method of claim 12 wherein the training signals are received covered with spreading or scrambling codes.

17. The method of claim 12 wherein the training signals are received at different times.

18. The method of claim 12 further comprising using the precoding matrices to precode the data transmitted to the nodes.

19. The method of claim 12 further comprising supporting by each of a plurality of antennas, one of the spatial streams to transmit data to the stations.

20. The method of claim 12 further comprising requesting training by providing to the nodes information relating to spreading or scrambling codes for the training signals.

21. The method of claim 20 wherein the information comprises the spreading or scrambling codes.

22. The method of claim 20 wherein the information provides sufficient information for computing the spreading or scrambling codes.

23. An apparatus for communicating with a plurality of nodes, comprising:

means for requesting training signals from the nodes by requesting each of the nodes to use a unique identifier in its training signal;

means for receiving the training signals transmitted from the nodes in response to the request;

means for calculating a channel state information matrix for each of the nodes from the training signals;

means for calculating precoding matrices that define spatial streams using the channel state information matrices, wherein at least one of the precoding matrices is calculated using a plurality of the channel state information matrices; and means for transmitting data to the nodes on the spatial streams.

24. The apparatus of claim 23 wherein the means for receiving training signals is configured to receive the training signals simultaneously within the same frequency band.

25. The apparatus of claim 23 wherein the means for requesting is configured to request by generating a training request message for transmission to the nodes, wherein the training request message comprises a schedule for the nodes to transmit their training signals.

26. The apparatus of claim 23 wherein the training signals were transmitted simultaneously.

27. The apparatus of claim 23 wherein the means for receiving is configured to receive the training signals covered with spreading or scrambling codes.

28. The apparatus of claim 23 wherein the means for receiving is configured to receive the training signals at different times.

29. The apparatus of claim 23 further comprising means for using the precoding matrices to precode the data transmitted to the nodes.

30. The apparatus of claim 23 further comprising means for supporting by each of a plurality of antennas, one of the spatial streams to transmit data to the stations.

31. The apparatus of claim 23 further comprising means for requesting training by providing to the nodes information relating to spreading or scrambling codes for the training signals.

32. The apparatus of claim 31 wherein the information comprises the spreading or scrambling codes.

33. The apparatus of claim 31 wherein the information provides sufficient information for computing the spreading or scrambling codes.

34. A computer-program product for communication with a plurality of nodes, comprising:

a computer-readable storage device encoded with instructions executable to:

request training signals from the nodes by requesting each of the nodes to use a unique identifier in its training signal;

receive the training signals transmitted from the nodes in response to the request;

calculate a channel state information matrix for each of the nodes from the training signals;

calculate precoding matrices that define spatial streams using the channel state information matrices, wherein at least one of the precoding matrices is calculated using a plurality of the channel state information matrices; and transmit data to the nodes on the spatial streams.

35. An access point, comprising:

a wireless network adapter configured to support a backhaul connection for a peer node to a network;

a processing system configured to:

request training signals from a plurality of nodes by requesting each of the nodes to use a unique identifier in its training signal;

receive the training signals transmitted from the nodes in response to the request;

calculate a channel state information matrix for each of the nodes from the training signals; and calculate precoding matrices that define spatial streams using the channel state information matrices, wherein at least one of the precoding matrices is calculated using a plurality of the channel state information matrices; and a transmitter configured to transmit data to the nodes on the spatial streams.

* * * * *